United States Patent
Aoki et al.

(10) Patent No.: US 9,352,310 B2
(45) Date of Patent: May 31, 2016

(54) CATALYTIC CONVERTER

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Yuki Aoki, Nisshin (JP); Hiromasa Suzuki, Toyota (JP); Hiroyuki Matsubara, Gifu (JP); Naohiro Hayashi, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 14/524,343

(22) Filed: Oct. 27, 2014

(65) Prior Publication Data

US 2015/0125354 A1 May 7, 2015

(30) Foreign Application Priority Data

Nov. 7, 2013 (JP) .................................. 2013-231291

(51) Int. Cl.
| | | |
|---|---|---|
| *B01D 53/94* | (2006.01) | |
| *B01J 35/00* | (2006.01) | |
| *B01J 35/04* | (2006.01) | |
| *F01N 3/28* | (2006.01) | |
| *F01N 13/00* | (2010.01) | |
| *B01J 23/63* | (2006.01) | |
| *B01J 35/10* | (2006.01) | |

(52) U.S. Cl.
CPC ......... *B01J 35/0006* (2013.01); *B01D 53/9454* (2013.01); *B01J 23/63* (2013.01); *B01J 35/04* (2013.01); *F01N 3/28* (2013.01); *F01N 3/2803* (2013.01); *F01N 3/2828* (2013.01); *F01N 13/0097* (2014.06); *B01D 53/9477* (2013.01); *B01D 2255/1021* (2013.01); *B01D 2255/1025* (2013.01); *B01D 2255/407* (2013.01); *B01J 35/10* (2013.01); *F01N 2330/48* (2013.01); *Y02T 10/22* (2013.01)

(58) Field of Classification Search
None
See application file for complete search history.

(56) References Cited

U.S. PATENT DOCUMENTS

| 5,916,133 A | * | 6/1999 | Buhrmaster | ......... | B01D 53/944 422/171 |
| 2013/0045148 A1 | * | 2/2013 | Chivilikhin | ........ | B01D 53/9454 423/212 |

FOREIGN PATENT DOCUMENTS

| GB | 2 342 055 A | 4/2000 |
| JP | A-9-317454 | 12/1997 |
| JP | A-2000-97019 | 4/2000 |
| JP | A-2007-218135 | 8/2007 |
| JP | A-2008-18370 | 1/2008 |

* cited by examiner

*Primary Examiner* — Walter D Griffin
*Assistant Examiner* — Jelitza Perez
(74) *Attorney, Agent, or Firm* — Oliff PLC

(57) ABSTRACT

A catalytic converter including: a cell structured first substrate; and a cell structured second substrate provided at a downstream side of the first substrate. The first substrate has a uniform cell density. The second substrate includes a center area with a first cell density and a surrounding area with a second cell density that is lower than the first cell density. The first substrate and the second substrate are mounted in tandem.

6 Claims, 5 Drawing Sheets

US 9,352,310 B2

CATALYTIC CONVERTER

INCORPORATION BY REFERENCE

The disclosure of Japanese Patent Application. No. 2013-231291 filed on Nov. 7, 2013 including the specification, drawings and abstract is incorporated herein by reference in its entirety.

BACKGROUND OF THE INVENTION

1. Field of the Invention

The present disclosure relates to a catalytic converter which is accommodated and fixed in a pipe which is consisted of an exhaust system of exhaust gas.

2. Description of Related Art

In various industries, large effect has been made world widely to reduce the environmental influence load, especially in the automobile industry, not only the gasoline engine automobiles with excellent fuel efficiency, but also the popularization of so-called eco-cars such as hybrid automobiles and electric automobiles and the improvement of their performances are developing every day. Besides the development of such eco-cars, research about the exhaust gas purification catalyst for purifying the exhaust gas exhausted from the engine is also extensively conducted. The exhaust gas purification catalyst includes oxide catalyst, three-way catalyst, NOx storage reduction catalyst, etc.; in the exhaust gas purification catalyst, noble metal catalyst, such as Platinum (Pt), Palladium (Pd), Radium (Rh), etc., is found to have catalyst activity, and the noble metal catalyst is usually used under a state supported by a support consisted of porous oxide such as alumina.

The gas exhaust system that connects the automobile engine and muffler is usually provided with a catalytic converter for purifying the exhaust gas. Sometimes, engine would emit environmental harmful substances such as CO, NOx, or uncombusted HC and VOC, in order to convert such harmful substances to acceptable substances, the exhaust gas passes through the catalytic converter, so that CO is converted to CO2, NOx is converted to N2 and O2, and VOC is combusted and generates CO2 and H2O, and the catalytic converter is provided by disposing a catalyst layer, in which the noble metal catalyst, such as Rh, Pd, and Pt, is supported by a support, on a cell wall of a substrate.

Incidentally, as an embodiment of the catalytic converter of related art, a tandem catalytic converter provided by disposing two cell structured substrates along a flowing direction of the exhaust gas may be used. The tandem catalytic converter changes the types of the noble metal catalyst and supporting amount supported at the substrate a the upstream side and the substrate of the downstream side, so as to achieve high catalyst activity.

Herein, FIG. 7 illustrates a catalytic converter in which two substrates are mounted in tandem of related arts. As illustrated in FIG. 7, the catalytic converter is as follows: at each of the upstream side (front side, Fr side) and downstream side (rear side, Rr side) of the flow of the exhaust gas in the interior of the duct H that consists the pipe system, is provided with one cell structured substrate, with a total of 2 cell structured substrates K1, K2, a catalyst layer consisted of the support and noble metal catalyst supported by the support are formed on the cell walls of the of the substrates K1, K2. In the catalytic converter, the cell densities of normal substrates K1, K2 are uniform.

Incidentally, since gas flow normally flows in the substrate with a relatively high flow rate at the center portion of the duct (center portion of the substrate) where there is no friction influence with the wall of the duct H, the problem is that in the cell structured substrate illustrated in FIG. 7, the flow rate distribution of the exhaust gas at the center area of the cross section of substrates K1, K2 is higher compared with that of the surrounding area, resulting in a reduction of exhaust gas amount flowed in the surrounding area, thus the catalyst in such area cannot be sufficiently used, and as a result, catalyst of the whole substrate cannot be sufficiently used.

As for the above problem, to improve the configuration of the tandem catalytic converter illustrated in FIG. 7 of related art, Japanese Patent Application Publication No. 9-317454A (JP 9-317454 A) discloses a catalytic converter as follows: changing the cell densities of the substrate at the upstream side and the substrate at the downstream side of the gas flow at the center area and surrounding area respectively, thereby equalizing the flow rate distribution and temperature distribution of the whole catalytic converter.

The catalytic converter disclosed in JP 9-317454 A is simulated in FIG. 8. In the catalytic converter illustrated by FIG. 8, in the substrate K1 at the upstream side, a center area K1a has a relatively higher cell density compared with that of a surrounding area K1b; and in the substrate K2 at the downstream side, in contrast, a surrounding area K2b has a relatively higher cell density compared with that of a center area K2a.

In the catalytic converter having substrates K1, K2 with such cell densities, after the exhaust gas flows along a direction X1 while entering the catalytic converter, in substrate K1 at the upstream side, the exhaust gas mainly flows in the surrounding area K1b where the cell density is low and the gas easily flows (direction X1'), then in the substrate K2 at the downstream side, the exhaust gas flows mainly in the center area K2a where the cell density is low and the gas easily flows.

However, as illustrated by FIG. 8, under a state that the cell density of the center area K1a of the substrate K1 at the upstream side where the exhaust gas initially flows with respect to the catalytic converter is high, the pressure loss to the exhaust gas flowing into the center area K1a with high flow rate distribution is high, as a result, the flow of the exhaust gas towards the substrate K1 is impended, thus the inflow amount of the exhaust gas to the catalytic converter is reduced.

Furthermore, if the inflow amount of the exhaust gas to the catalytic converter is reduced, the heat supply to the catalytic converter is inevitably reduced, and the warming-up performance after the starting of the engine is reduced. Along with the reduction of the warming-up performance after the starting of the engine, the emission (cold emission) of the HC and NOx is reduced.

In addition, Japanese Patent Application Publication No. 2000-97019 A (JP 2000-97019 A) discloses a catalytic converter (herein is an exhaust gas processing device for an automobile) provided with a substrate with a high cell density of a center area at the upstream side, and a substrate with uniform cell density at the downstream side.

However, even according to the catalytic converter disclosed by JP 2000-97019 A, it is the same with that disclosed by JP 9-317454 A, since the cell density of the center area of the substrate at the upstream side is high, the problem that the exhaust gas flow is impended and the inflow amount of exhaust gas is reduced still exists.

SUMMARY OF THE INVENTION

The present disclosure provides a catalytic converter, which has a high warming-up performance after the starting of the engine, and has excellent exhaust gas purification performance by effectively utilize the whole catalyst.

An aspect of the present invention relates to a catalytic converter comprising: a cell structured first substrate having a uniform cell density; and a cell structured second substrate that is provided at a downstream side of the first substrate. The second substrate includes a center area with a first cell density and a surrounding area with a second cell density that is lower than the first cell density. The first substrate and the second substrate are mounted in tandem.

The catalytic converter is a tandem-type catalytic converter which has two cell structured substrates, i.e., the first and the second substrates, from the upstream side of exhaust gas flow in sequence; in which the first substrate utilizes a substrate that has a uniform cell density, and the second substrate positioned at the downstream side is a substrate in which the center area has a relatively high cell density with respect to a surrounding area. Through this configuration, one of the substrates has a uniform cell density, thus, comparing with the embodiment that both of the two substrates change the cell density, it has the advantage of being easy to be manufactured. Furthermore, the flow rate distribution of the exhaust gas in the cross section of the second substrate positioned at the downstream side can be eased as much as possible to achieve uniformization, thus, the above effect can also influence the first substrate positioned at the upstream side, the flow rate distribution of the exhaust gas in the cross section of the first substrate can also be eased as much as possible to achieve uniformization. As a result, all catalysts in the first and second substrates can be effectively used, the exhaust gas purification performance can be improved.

Herein, for two tandem-type substrates, by changing the cell density in the cross section of the substrate at the downstream side, the uniformization of flow rate distribution of exhaust gas can be achieved, and above effect can also influence the uniformization of flow rate distribution of exhaust gas in the substrate positioned at the upstream side with a uniform cell density, such effect is the novel effect achieved by the above catalytic converter.

In addition, since the cell density of the substrate positioned at the upstream side is uniform, for example, since the center area does not have a high cell density, a rising of pressure loss to the exhaust gas flow of the substrate at the upstream side where the exhaust initially flows in is restrained, an excellent exhaust gas flow and an excellent heat supply to the catalytic converter are guaranteed, and a high warming-up performance after the starting of the engine is guaranteed.

In addition, according to the verifications of the inventors of the present disclosure, in the second substrate, by setting the ratio of the cell density of the center area to the cell density of the surrounding area to a range of larger than 1 and equal to or smaller than 2, a catalytic converter with very high emission reduction effect is verified.

Herein, as the used cell structured substrate, in addition to the substrate consisted of ceramic raw material such as cordierite or silicon carbide consisted of a composite oxide of a magnesium oxide, an aluminum oxide and a silicon dioxide, other substrates of raw material other than ceramic raw material, such as metal raw material may be used. In addition, the configuration utilizes the so-called honeycomb structure of the cell with a plurality of lattice shapes such as quadrilateral, hexagon or octagon.

In addition, as a support that is included in a catalyst layer formed on a surface of cell walls of the substrates, an oxide with a main component of at least one of ceria ($CeO_2$), zirconia ($ZrO_2$) and alumina ($Al_2O_3$) which are porous oxide, oxide consisted of any one of $CeO_2$, $ZrO2$ and $Al_2O_3$ may be used, and a composite oxide consisted of more than two components (the so-called CZ material is $CeO_2$—$ZrO_2$ compound, $Al_2O_3$—$CeO_2$—$ZrO_2$ three-system composite oxide introduced with $Al_2O_3$ as a diffusion barrier (ACZ material), etc.) may be used.

The above catalytic converter is preferred to have a cordierite honeycomb support with excellent anti-thermal-shock performance; otherwise it may be an electrically heated catalytic converter (EHC). The electrically heated catalytic converter is such a catalytic converter, for example, installs a pair of electrodes on the honeycomb catalyst, the electrodes are energized to the heat honeycomb catalyst, to improve the activity of the honeycomb catalyst and further to neutralize the exhaust gas passing through the catalytic converter, by applying the above catalytic converter to a gas exhaust system connecting an automobile engine and a muffler, thus, in addition to purifying the exhaust gas at room temperature, the catalyst can be activated by electrically heating to purify the exhaust gas when it is cold.

As can be acknowledged from the above description, according to the above catalytic converter, the catalytic converter of an aspect of the present disclosure relates to a catalytic converter, in which a first substrate at a upstream side of the exhaust gas flow and a second substrate at a downstream side of the exhaust gas flow are mounted in tandem, and the cell density of the first substrate is uniform, and the second substrate includes a center area with a relatively high cell density and a surrounding area with a relatively low cell density, thus, an excellent flow of the exhaust gas to the catalytic converter can be guaranteed, the heat supply to the catalytic converter can be promoted, the warming-up performance after the starting of the engine can be increased, and a cold emission reduction effect can be improved. In addition, only the cell density in the cross section of the second substrate at the downstream side changes, thus, comparing with the embodiment that both of the two substrates change the cell density, it has advantages of being easy to be manufactured. Furthermore, the flow rate distribution of the exhaust gas in the cross section of the second substrate positioned at the downstream side can be eased as much as possible to achieve uniformization, and above effect can influence the first substrate positioned at the upstream side, the flow rate distribution of the exhaust gas in the cross section of the first substrate can be eased as much as possible to achieve uniformization. As a result, all catalysts in the first and second substrates can be effectively used, to improve the exhaust gas purification performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, the embodiments of the catalytic converter of present disclosure are described.

(Exhaust Gas System)

Figure 1:
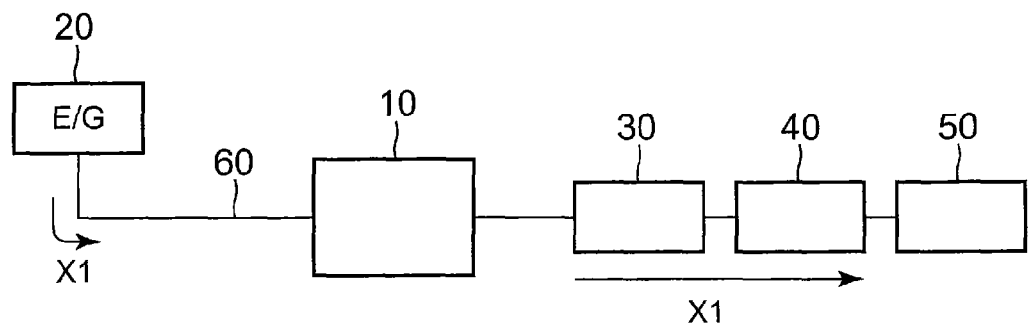
FIG. 1 is an illustration drawing illustrating the gas exhaust system that a catalytic converter is provided therebetween.

FIG. 1 is an illustration drawing illustrating the gas exhaust system in which a catalytic converter is provided therebetween.

The gas exhaust system illustrated in FIG. 1 is provided with an engine 20, a catalytic converter 10, a three-way catalytic converter 30, a sub-muffler 40 and a main muffler 50, which are connected to each other through a system pipe 60, the exhaust gas generated by the engine 20 is exhausted along a direction X1 as illustrated in FIG. 1. In the exhaust system of FIG. 1, when the catalytic converter 10 is an electrically heated catalytic converter (EHC), for example, when the engine 20 is started, a honeycomb catalyst that consists the electrically heated catalytic converter is heated and risen to a predetermined temperature as quickly as possible, so that the exhaust gas exhausted from the engine is purified by the honeycomb catalyst, and the exhaust gas which is not purified by the electrically heated catalytic converter is purified by the three-way catalytic converter 30 positioned at the downstream side. Next, an embodiment of the catalytic converter is described.

(Embodiment of the Catalytic Converter)

Figure 2:
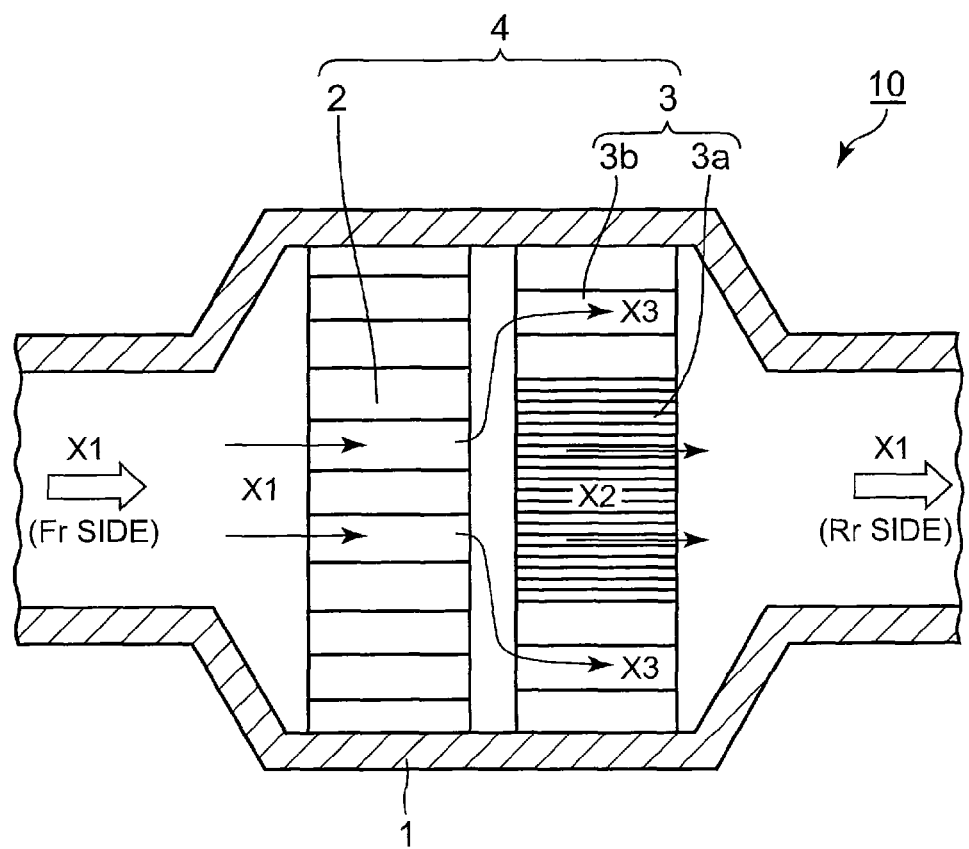
FIG. 2 is an illustration drawing illustrating the embodiment of the catalytic converter.

FIG. 2 is an illustration drawing illustrating the embodiment of the catalytic converter. The catalytic converter 10 illustrated in FIG. 2 substantially includes a hollow tubular pipeline 1, and a tandem-type substrate 4 accommodated in the pipeline 1; in which the tandem-type substrate 4 includes a first substrate 2 positioned at an upstream side of the exhaust gas flow, and a second substrate 3 positioned at the downstream side.

Herein, as the raw material of the first substrate 2 and the second substrate 3, ceramic raw material such as cordierite or silicon carbide consisted of a composite oxide of a magnesium oxide, an aluminum oxide and a silicon dioxide, or raw material other than ceramic raw material, such as metal raw material may be used. Furthermore, as a support that is included in a catalyst layer (not illustrated) formed on a surface of cell walls of the first substrate 2 and the second substrate 3, an oxide with a main component of at least one of ceria ($CeO_2$), zirconia ($ZrO_2$) and alumina ($Al_2O_3$) which are porous oxide may be used, and oxide consisted of any one of $CeO_2$, $ZrO_2$ and $Al_2O_3$, and a composite oxide consisted of more than two components (the so-called CZ material is $CeO_2$—$ZrO2$ compound, $Al_2O_3$—$CeO_2$—$ZrO_2$ three-way system composite oxide introduced with $Al_2O_3$ as a diffusion barrier (ACZ material), etc.) may be used.

The first substrate 2 and the second substrate 3 are consisted of a honeycomb structure having a plurality of cells of lattice shape such as quadrilateral, hexagon or octagon. The exhaust gas, which flows into the cell of an end portion at the upstream side (Fr side) in the flowing direction of the exhaust gas in the first substrate 2 and the second substrate 3, flows in the pipeline 1, and is purified while the exhaust gas flows in the first substrate 2 and the second substrate 3, the purified exhaust gas flows out of an end portion of the downstream side (Rr side) in the flowing direction of the exhaust gas in the first substrate 2 and the second substrate 3 (direction X1).

In the tandem-type substrate 4, the cell density of the first substrate 2 positioned at the upstream side is uniform, and the second substrate 3 positioned at the downstream side consisted of a center area 3a with a relatively high cell density and a surrounding area 3b with a relatively low cell density. Therefore, the exhaust gas which flows into the first substrate 2 (direction X1), comparing to flowing toward the center area 3a with a relatively high cell density (direction X2), the flowing toward the surrounding area 3b with a relatively low cell density (direction X3) is promoted.

Figure 3:
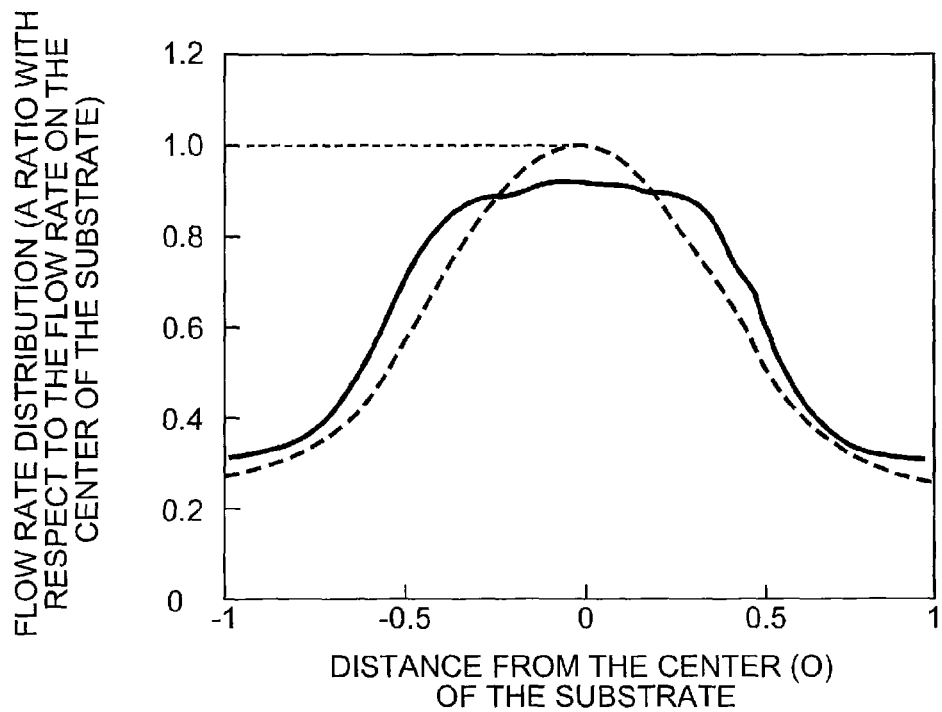
FIG. 3 is an illustration drawing illustrating the flow, rate distribution of the exhaust gas in the cross section of the substrate, and also an illustration drawing illustrating the result of the experiments verifying the flow rate distribution in the cross section of the substrate at the upstream side.

Herein, FIG. 3 is an illustration drawing illustrating the flow rate distribution of the exhaust gas in the cross section of the substrate. As illustrated by the broken lines of FIG. 3, large flow rate distribution is generated in the substrate with uniform cell density. In contrast, like the second substrate 3, by changing the cell density in the cross section, as illustrated by solid lines, the flow rate distribution in the cross section is eased, and uniformization is achieved.

According to the catalytic converter 10 of FIG. 2, by making the cell density of the first substrate 2 at the upstream side where the exhaust gas initially flows in uniform in the whole cross section, the manufacture of the first substrate 2 is easy because there is no different kinds of cell density, and a rising of pressure loss to the flow of the exhaust gas is restrained. An excellent exhaust gas flow and excellent heat supply to the catalytic converter are guaranteed. A high warming-up performance after the starting of the engine is guaranteed, and a cold emission of the HC and NOx is effectively restrained.

Furthermore, the center area 3a has a relatively higher cell density with respect to the surrounding area 3b in the second substrate 3 at the downstream side; thus, the flow rate distribution of the exhaust gas in the cross section of the second substrate 3 can be eased as much as possible to achieve uniformization. Besides, this effect will also influence the first substrate 2 positioned at the upstream side, the flow rate distribution of the exhaust gas in the cross-section of the first substrate 2 can be eased as much as possible to achieve uniformization; as a result, all the catalyst in the first substrate 2 and the second substrate 3 can be effectively used.

In addition, about the cell density of the surrounding area 3b and the center area 3a of the second substrate 3, by setting the ratio of the cell density of the center area 3a to the cell density of the surrounding area 3b to a range of larger than 1 and equal to or smaller than 2, a catalytic converter with a very high emission reduction effect is produced.

In addition, the lengths in the flow direction of the exhaust gas of the center area 3a and the surrounding area 3b of the second substrate 3 in FIG. 2 are the same, but the length of the surrounding area with low cell density can be relatively extended.

[Experiments and the Result Relating to the Flow Rate Distribution and Purification Performance of the First Substrate at the Upstream Side]

The inventors of present disclosure conducted experiments relating to the flow rate distribution and purification performance of the first substrate at the upstream side about the catalytic converter having tandem-type substrates. Hereinafter, in the catalytic converters of Example 1 and Comparative Example 1, the substrates at the upstream side both have the same configurations, while the substrates at the downstream side are different in Example 1 and Comparative Example 1.

(About the Substrates at the Upstream Side (the Substrates Used in Example 1 and Comparative Example 1 are the Same))

A honeycomb structured substrate made of cordierite is manufactured by press forming. The sizes of the honeycomb structure are as follows: a diameter of a circular cross section perpendicular to the flow direction of the exhaust gas is 103 mm, a length of a longitudinal direction is 105 mm, a cell density is 600 cpsi (93 per $cm^2$), and the lattice shapes of the cells are all hexagon. In addition, the support constituting the catalyst layer is $Al_2O_3$—$CeO_2$—$ZrO_2$ composite oxide (ACZ material) supported with 1.0 g/L of Pd and 0.2 g/L of Rh as noble metal catalyst.

(About the Substrate at the Downstream Side)

Example 1

A honeycomb structured substrate made of cordierite is manufactured by press forming, and the cell densities in the center area and the surrounding area are different. The sizes of the honeycomb structure are as follows: a diameter φ of a circular cross section perpendicular to the flow direction of the exhaust gas is 103 mm, a length of a longitudinal direction is 105 mm, a cell density of the surrounding area with low cell density is 300 cpsi (52 per $cm^2$), a cell density of the center area with high cell density is 600 cpsi (93 per $cm^2$), and lattice shapes of the cells are all quadrilateral. In addition, the support constituting the catalyst layer is $Al_2O_3$—$CeO_2$—$ZrO_2$ composite oxide (ACZ material) supported with 0.3 g/L of Pt and 0.1 g/L of Rh as noble metal catalyst Comparative Example 1

The cell density of the whole substrate is uniform, which is 500 cpsi (78 per $cm^2$), and the other parameters are same with Example 1

Herein, Example 1 is as follows: the cell density of the substrate at the upstream side is uniform, and the substrate at the downstream side is consisted of a center area with a high cell density and a surrounding area with a low cell density; and the Comparative Example 1 is consisted of a substrate which has a specific and uniform cell density at the upstream side and downstream side, respectively.

(Experimental Method)

A hole was opened on a side surface of the catalytic converter, and a hydrometer was inserted in to measure the flow rate distribution by conducting an endurance test for 50 hours, in the endurance test, an actual engine was used, the catalyst bed temperature was 950° C., a cycle included feedback, fuel cutoff, fuel-lean, and fuel-rich at 1 minute. In addition, in the purification performance evaluation method, each of the catalytic converters of Example 1 and Comparative Example 1 was provided in the actual engine to drive the engine, and measures the NOx emission amount.

(Experiment Result)

Figure 4:
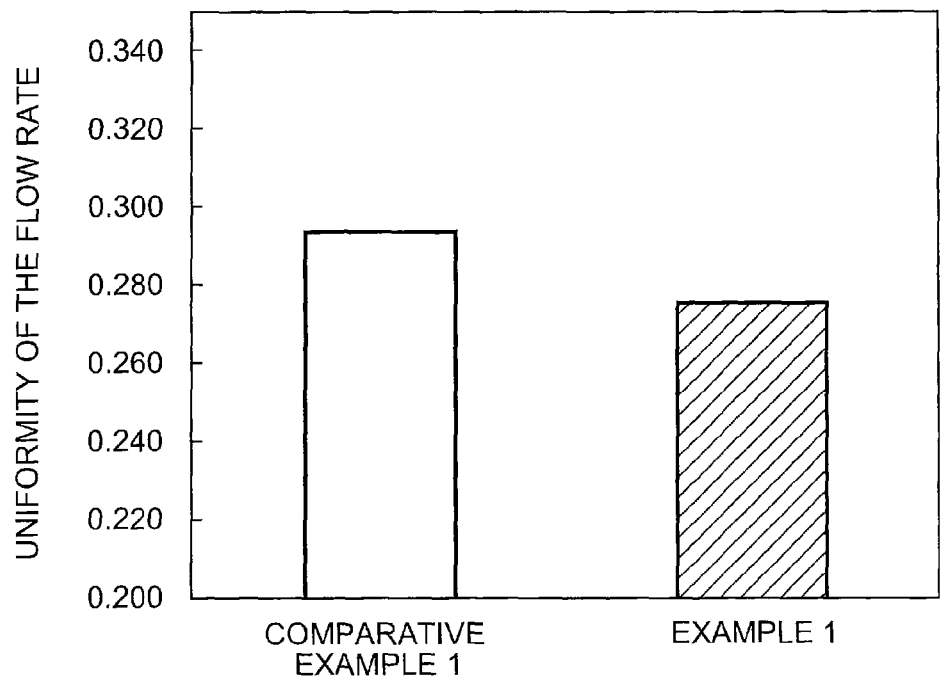
FIG. 4 is an illustration drawing illustrating the result of the experiments verifying the flow rate distribution in the cross section of the substrate at the upstream side.
Figure 5:
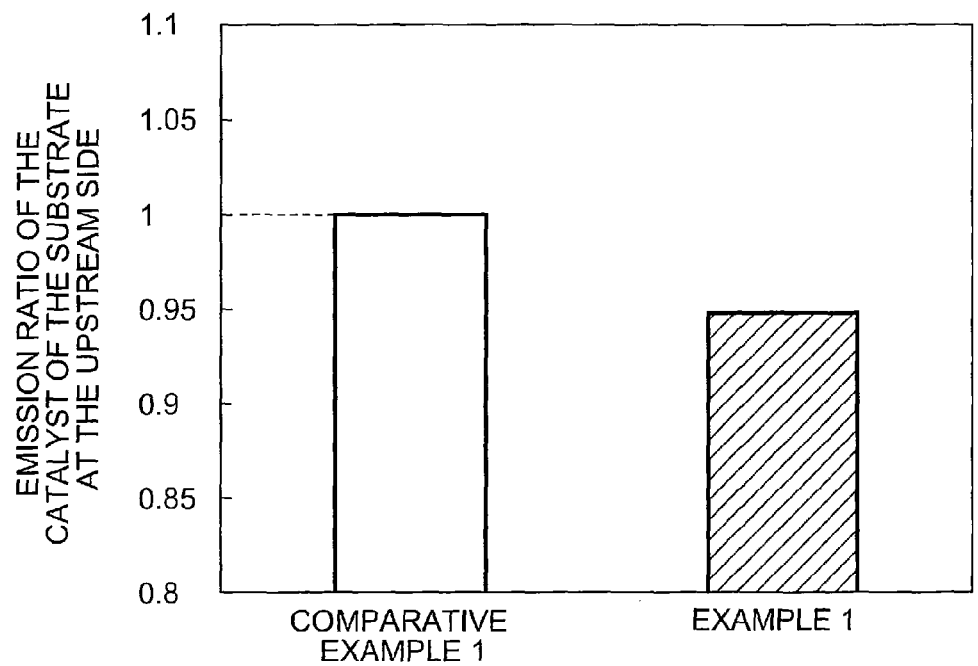
FIG. 5 is an illustration drawing illustrating the result of the experiments relating to the emission ratio of the catalyst of the substrate at the upstream side.

The experiment result is illustrated by FIG. 4 and FIG. 5. Herein, FIG. 4 is an illustration drawing illustrating the experiment result verifying the flow rate distribution in the cross section of the first substrate at the upstream side, and FIG. 5 is an illustration drawing illustrating the result of the experiment relating to the emission ratio of the catalyst of the first substrate at the upstream side.

Firstly, about the flow rate distribution of the substrate at the upstream side, FIG. 3 also illustrates the experiment result, in which the broken lines illustrate the flow rate distribution in Comparative Example 1, and the solid lines illustrate the flow rate distribution in Example 1. In FIG. 3, a flow rate of the gas was measured with an interval of 5 mm, the maximum flow rate in Comparative Example 1 was standardized as 1, and each of the flow rates of Example 1 and Comparative Example 1 was evaluated. In addition, FIG. 4 illustrates the uniformity of the flow rate distribution by standardizing the maximum flow rates in Example 1 and Comparative Example 1 as 1 respectively, and taking the standard deviation of each measure point. Moreover, FIG. 5 illustrates the ratio of Example 1 with respect to Comparative Example 1; it is obtained by measuring the NOx amount behind the substrate at the upstream side and in front of the substrate at the downstream side, and standardizing the NOx reduction amount of Comparative Example 1 as 1.

Firstly, as can be known from FIG. 3, compared with Comparative Example 1, the flow rate distribution of the substrate in Example 1 was largely eased. This was also verified by the differences between the uniformity of the flowing speed in Comparative Example 1 and Example 1 illustrated by FIG. 4.

In addition, as can be known from FIG. 5, compared with Comparative Example 1, the emission amount caused by the substrate at the upstream side in Example 1 reduced about 5%.

This is because the substrate at the downstream side eased the flow rate distribution in Example 1, and above effect also influenced the substrate at the upstream side.

[Experiment Result for Determining the Correlation Between the Cell Density Ratio and the Emission Ratio, the Cell Density Ratio is Between the Center Area and the Surrounding Area of the Substrate at the Downstream Side]

The inventors of present disclosure further conducted experiments for determining the correlation between cell density ratio and the emission ratio, the cell density ratio is between the center area and the surrounding area of the substrate at the downstream side. Hereinafter, Table 1 illustrates the cell densities of the substrate at the downstream side in Examples 2 and 3 and Comparative Example 2, in addition to Example 1 and Comparative Example 1. In addition, the cell densities at the upstream side and all the catalytic converters are same with that of Comparative Example 1 and Example 1. Besides, the average cell densities of all the catalysts are 500 cpsi.

TABLE 1

|  |  | CE 1 | Ex 1 | Ex 2 | Ex 3 | CE 2 |
|---|---|---|---|---|---|---|
| Cell density of the center area | cpsi (per $cm^2$) | 500 (78) | 600 (93) | 550 (85) | 650 (101) | 700 (109) |
| Cell density of the surrounding area | cpsi (per $cm^2$) | — | 400 (62) | 450 (70) | 350 (54) | 300 (47) |
| Ratio of the cell density | — | 1 | 1.5 | 1.22 | 1.86 | 2.33 |

In table 1, CE refers to "Comparative Example", and Ex refers to "Example".

Figure 6:
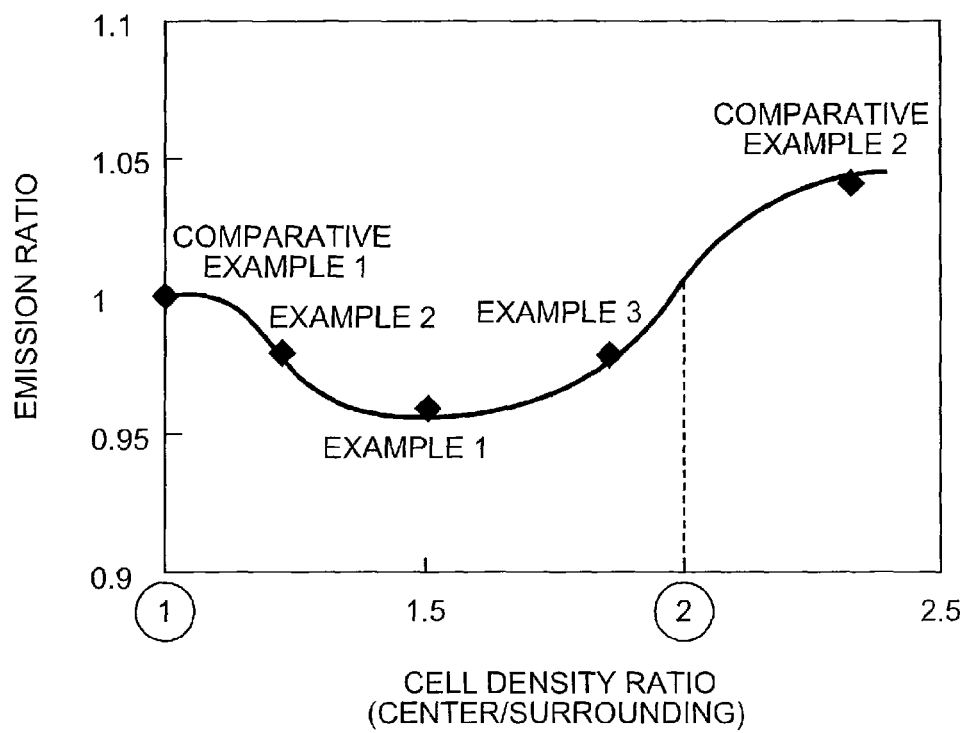
FIG. 6 is an illustration drawing illustrating the result of the experiments for determining the cell density ratio between the center area and the surrounding area of the substrate at the downstream side, and its correlation with the emission ratio.
Figure 7:
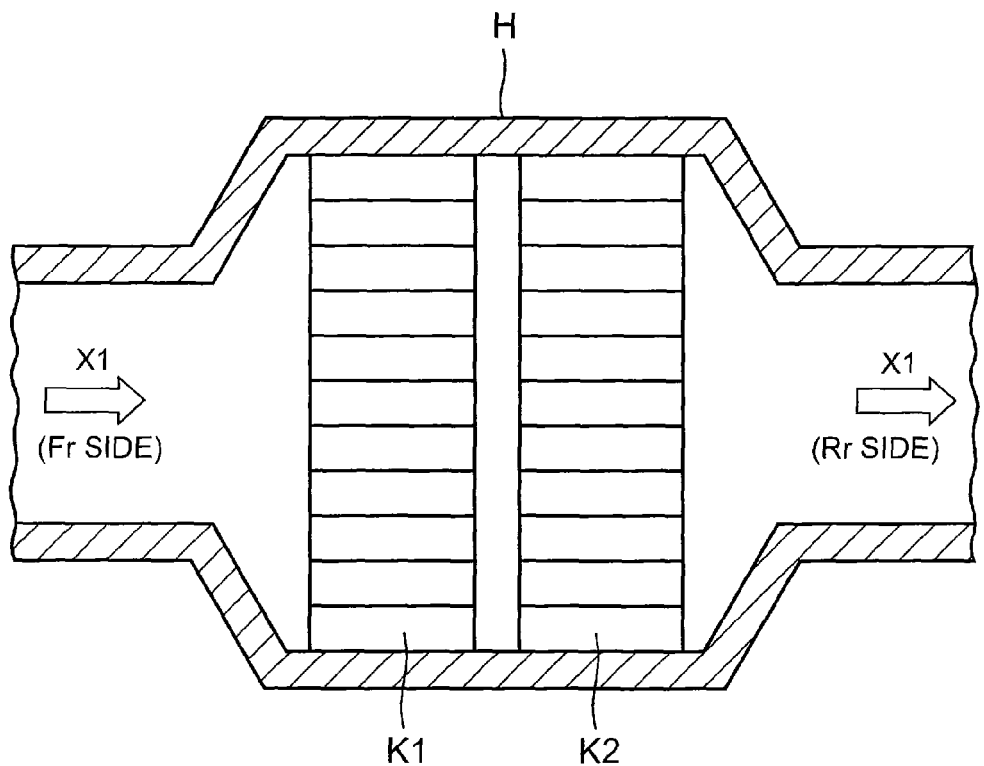
FIG. 7 is an illustration drawing illustrating the embodiments of the catalytic converter in the related arts.
Figure 8:
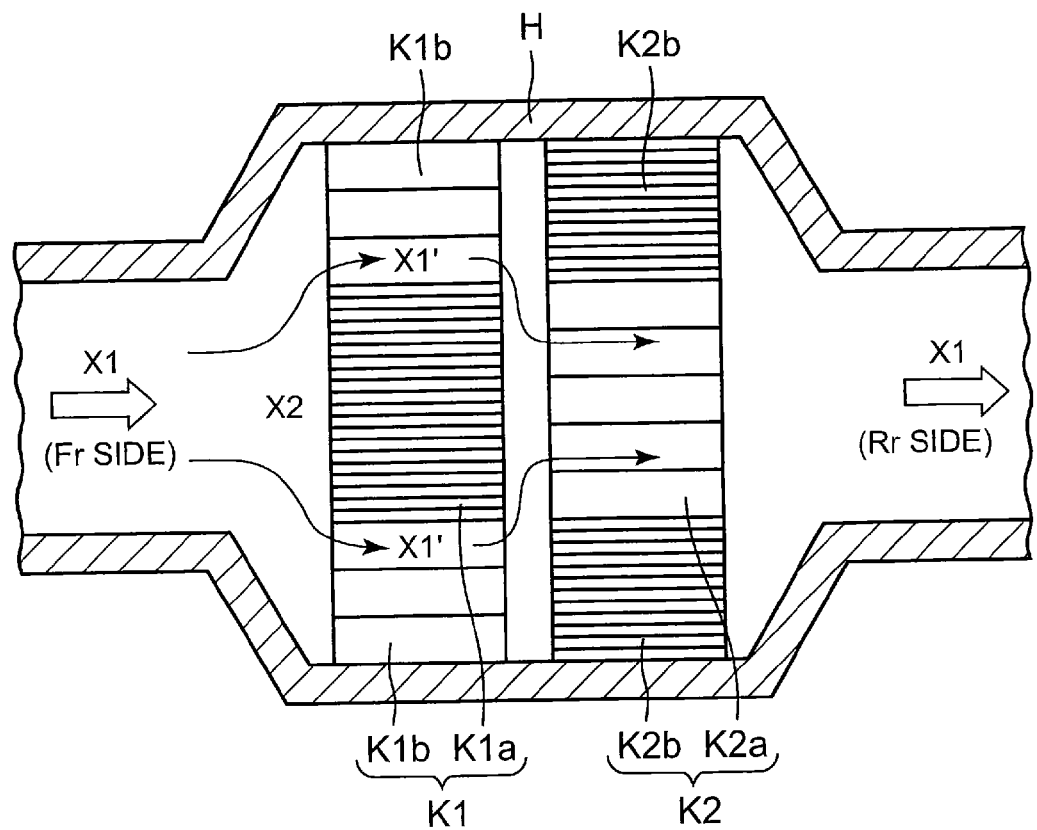
FIG. 8 is an illustration drawing illustrating the embodiments of the catalytic converter disclosed by the related art (JP 9-317454 A)

FIG. 6 illustrates the experiment result. From FIG. 6, it is known that: an inflection point comes at Comparative Example 1 (the cell density ratio 1) and the cell density ratio 2 between Example 3 and Comparative Example 2, the emission ratio reduces therebetween, thus, in the substrate at the downstream side, the ratio of the cell density of the center area to the cell density of the surrounding area is in a range of larger than 1 and equal to or smaller than 2, a high emission reduction effect can be achieved.

The embodiments of present disclosure have been descried with reference to the figures, but the specific configuration is not limited to the above-described embodiments, modifications within the purpose of present disclosure fall within the scope of the present disclosure.

What is claimed is:

1. A catalytic converter, comprising:
    a cell structured first substrate having a uniform cell density; and
    a cell structured second substrate, provided at a downstream side of the first substrate, the second substrate including a center area with a first cell density and a surrounding area with a second cell density that is lower than the first cell density,
    wherein the first substrate and the second substrate are mounted in tandem, and
    wherein in the second substrate, a ratio of the first cell density of the center area to the second cell density of the surrounding area is in a range of larger than 1 and equal to or smaller than 2.

2. The catalytic converter according to claim 1, wherein the ratio is from 1.22 to 1.86.

3. An exhaust gas after-treatment system comprising the catalytic converter according to claim 1, wherein the first substrate is located at an upstream side of the exhaust gas flow, and the second substrate is located at a downstream side of the exhaust gas flow, through said system.

4. An exhaust gas after-treatment system comprising the catalytic converter according to claim 2, wherein the first substrate is located at an upstream side of the exhaust gas flow, and the second substrate is located at a downstream side of the exhaust gas flow, through said system.

5. A method of operating an exhaust gas after-treatment system comprising passing an exhaust gas through the exhaust gas after-treatment system according to claim 3.

6. A method of operating an exhaust gas after-treatment system comprising passing an exhaust gas through the exhaust gas after-treatment system according to claim 4.

* * * * *